US007023443B2

(12) United States Patent
Yu

(10) Patent No.: US 7,023,443 B2
(45) Date of Patent: Apr. 4, 2006

(54) MEMORY MANAGEMENT APPARATUS AND METHOD FOR PREVENTING IMAGE TEARING IN VIDEO REPRODUCING SYSTEM

(75) Inventor: Gyeong-ho Yu, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/750,841

(22) Filed: Jan. 5, 2004

(65) Prior Publication Data

US 2004/0135789 A1 Jul. 15, 2004

(30) Foreign Application Priority Data

Jan. 6, 2003 (KR) ...................... 10-2003-0000539

(51) Int. Cl.
*G09G 5/399* (2006.01)
*G06F 12/06* (2006.01)

(52) U.S. Cl. ....................... 345/539; 345/572; 345/574

(58) Field of Classification Search ................ 345/539, 345/572, 574, 558, 531, 536, 530, 564, 537, 345/534
See application file for complete search history.

(56) References Cited

U.S. PATENT DOCUMENTS 5,727,192 A * 3/1998 Baldwin ..................... 345/522
5,808,629 A * 9/1998 Nally et al. ................. 345/539
5,850,232 A * 12/1998 Engstrom et al. ........... 345/539
6,100,906 A * 8/2000 Asaro et al. ................ 345/539

FOREIGN PATENT DOCUMENTS

JP 09-163182 6/1997
KR 1995-0030681 11/1995

* cited by examiner

*Primary Examiner*—Kee M. Tung
*Assistant Examiner*—Joni Hsu
(74) *Attorney, Agent, or Firm*—Staas & Halsey LLP

(57) ABSTRACT

A memory management apparatus and method for protecting an image tearing in the video system. The memory management apparatus includes a scaler that converts the format of input image data into a suitable format to fit the resolution of a display, a first memory, in which the format-converted image data is written, or from which the format-converted image data is read, and a second memory which is substituted for the first memory, so that addresses for reading or writing do not overlap addresses for writing or reading, respectively, due to a difference between a data reading rate and a data writing rate.

23 Claims, 2 Drawing Sheets

MEMORY MANAGEMENT APPARATUS AND METHOD FOR PREVENTING IMAGE TEARING IN VIDEO REPRODUCING SYSTEM

CROSS-REFERENCE TO RELATED APPLICATIONS

This application claims the benefit of Korean Patent Application No. 2003-539, filed on Jan. 6, 2003, in the Korean Intellectual Property Office, the disclosure of which is incorporated herein in its entirety by reference.

BACKGROUND OF THE INVENTION

1. Field of the Invention

The present invention relates to a video reproducing system, and more particularly, to a memory management apparatus and method for preventing image tearing in the video reproducing system.

2. Description of the Related Art

FIG. 1 is a schematic block diagram partially showing a conventional video reproducing system. Generally, a video reproducing system includes a scaler 100 and a memory 110 as shown in FIG. 1. In FIG. 1, the scaler 100 compresses or expands input image data to fit the resolution of a display (not shown) on which the image data are to be displayed. In addition, the scaler 100 can also perform frame-rate conversion as well as generating vertical and horizontal frequencies required for displaying.

The memory 110 stores data associated with the scaler 100. In other words, the scaler 100 converts the format of the input image data into an image format that corresponds to the resolution of the display, and then writes the format-converted input image data into the memory 110. The scaler 100 may also read format-converted input image data stored in the memory 110 and output it to the display. During the read/write operations of the memory 110, the data output rate may often exceed the data input rate. When this occurs, the data being output from the memory 110 may not be new data which has not yet been read from the memory 110, but instead it may be old data which has already been read out from the memory 110, thereby causing image tearing to occur on the display. Image tearing typically occurs when the screen refresh rate, which corresponds to the data input rate of the memory 110, is out of sync with the frame rate of the display, which corresponds to the data output rate of the memory 110. In image tearing, the top of frame data simultaneously appears with the bottom of other frame data in a single picture. When this occurs, a gap between the two partial images may be observed.

SUMMARY OF THE INVENTION

The present invention provides a memory management apparatus and method for preventing image tearing in a video reproducing system which manages a plurality of memories.

According to an aspect of the present invention, there is a memory management apparatus in a video reproducing system. The apparatus comprises: a scaler that converts the format of input image data into a format that matches the resolution of a display; a first memory, in which the format-converted image data is written, or from which the format-converted image data is read; and a second memory which is selectively substituted for the first memory, so that addresses for reading and/or writing do not overlap addresses for writing and/or reading, respectively, due to a difference between a data reading rate and a data writing rate.

In another aspect of the present invention, the apparatus further includes a memory controller which controls the substitution of the second memory for the first memory.

In a further aspect of the present invention, the memory controller calculates a desired address offset between the addresses for reading and writing in the first memory, using the data reading rate, the data writing rate, and the resolution of the display. If a distance between the current addresses for reading and writing is within the desired address offset, the memory controller starts to write the format converted image data output from the scaler to the second memory instead of the first memory. The term distance, as used above, refers to a logical distance between the addresses.

According to an aspect of the present invention, when the reading rate (Dclocck) is faster than the writing rate (Mclock) in the first memory, the desired address offset, Address_offset, can be calculated as follows:

$$\text{Address\_offset}=(\text{a maximum address of the first memory})\times(D\text{clock}-M\text{clock})/D\text{clock}$$

According to an aspect of the present invention, the maximum address of the first memory can be calculated by multiplying the resolution of the display by 3.

According to an aspect of the present invention, when the writing rate (Mclocck) is faster than the reading rate (Dclock) in the first memory, the desired address offset, Address_offset, can be calculated as follows:

$$\text{Address\_offset}=(\text{a maximum address of the first memory})\times(M\text{clock}-D\text{clock})/M\text{clock}$$

According to another aspect of the present invention, there is a memory management method for preventing image tearing in a video reproducing system. The method comprises: measuring a data writing rate (Mclock) and a data reading rate (Dclock) of a first memory; calculating an offset distance between addresses for the current writing and reading; and writing image data in a second memory instead of the first memory if the offset distance is within a predetermined desired address offset.

According to an aspect of the present invention, when the data writing rate (Mclock) is faster than the data reading rate (Dclock), the predetermined desired address offset, Address_offset, can be calculated by:

$$\text{Address\_offset}=(\text{a maximum address of the first memory})\times(M\text{clock}-D\text{clock})/M\text{clock}$$

According to an aspect of the present invention, the maximum address of the first memory can be calculated by multiplying the resolution of a display, on which image data are to be displayed by 3.

According to an aspect of the present invention, when the reading rate (Dclock) is faster than the writing rate (Mclock) in the first memory, the desired address offset, Address_offset, can be calculated by:

$$\text{Address\_offset}=(\text{a maximum address of the first memory})\times(D\text{clock}-M\text{clock})/D\text{clock}$$

According to yet another aspect of the present invention, there is a memory management method for preventing image tearing in a video reproducing system. The method comprises: measuring a data writing rate (Mclock) and a data reading rate (Dclock) of a first memory; comparing the data writing rate to the data reading rate; calculating a e desired address offset if the data reading rate is faster than the data writing rate; determining the relative address for data writing to a base address for data reading; and determining if the distance between the relative address for data writing and the base address for data reading is equal to or greater than the desired address offset. If the distance is equal to or greater than the desired address offset, the data writing and the data reading in the first memory is continued. If the distance is within the desired address offset, the data is written in the second memory instead of the first memory.

According to an aspect of the present invention, the desired address offset, Address_offset, can be calculated as follows:

Address_offset=(a maximum address of the first memory)×(*D*clock−*M*clock)/*D*clock According to still another aspect of the present invention, there is a memory management method for preventing image tearing in a video reproducing system, the method comprising: measuring a data writing rate (Mclock) and a data reading rate (Dclock) of a first memory; comparing the data writing rate to the data reading rate; calculating a desired address offset if the data writing rate is faster than the data reading rate; determining a relative address for data reading from a base address for data writing; determining if a distance between the relative address for data reading and the base address for data writing is equal to or greater than the desired address offset; if the distance is equal to or greater than the desired address offset, continuing the data writing and the data reading in the first memory; and if the distance is less than the desired address offset, performing the data writing in the second memory instead of the first memory.

According to an aspect of the present invention, the desired address offset, Address_offset, can be calculated as follows:

Address_offset=(a maximum address of the first memory)×(*M*clock−*D*clock)/*M*clock According to an aspect of the present invention, the maximum address of the first memory can be calculated by multiplying the resolution of a display, on which image data are to be displayed by 3.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
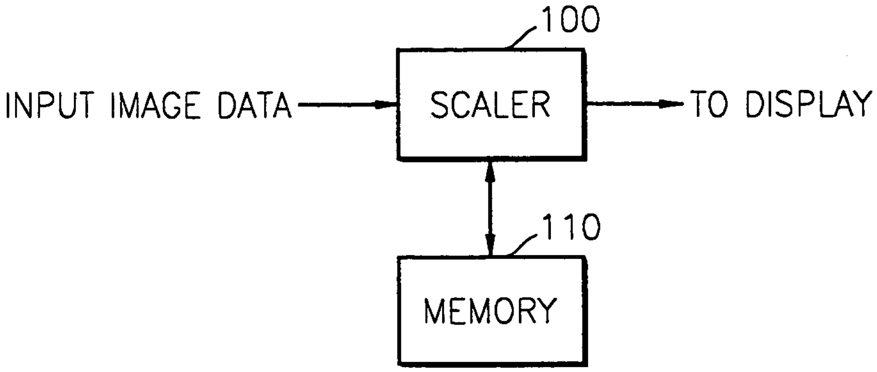
FIG. 1 (PRIOR ART)
FIG. 1 is a schematic partial block diagram of a conventional video reproducing system.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention provides a memory management apparatus and method for preventing image tearing in a video reproducing system.

Figure 2:
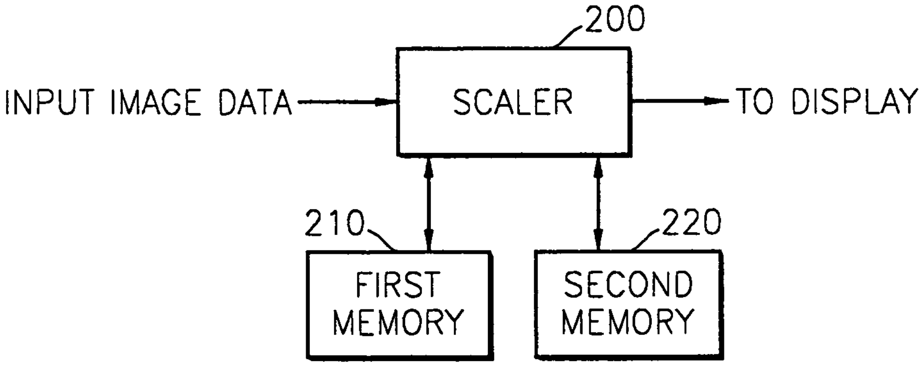
FIG. 2 is a schematic block diagram of a memory management apparatus for preventing image tearing in a video reproducing system according to an embodiment of the present invention.

FIG. 2 shows part of a video reproducing system including an embodiment of a memory management apparatus for preventing image tearing. The video reproducing system includes a scaler 200, a first memory 210, and a second memory 220.

The scaler 200 converts input image data to fit the resolution of a display (not shown), on which the image data is to be displayed.

The first memory 210 is a storage unit into which format-converted input image data is written at a first predetermined rate, or from which the format-converted input image data is read at a second predetermined rate. If the first predetermined rate is much faster than the second predetermined rate at a point in time, new image data may be overwritten in the addresses in which existing image data is stored, before the existing image data is read out from the first memory 210. If the second predetermined rate is much faster than the first predetermined rate at a point in time, old image data, which has already been read out, may be read out again.

The second memory 220 is an alternate storage unit for the first memory 210. It is determined whether a stable offset (distance), i.e., a desired distance between the relative addresses for writing and reading, is secured between addresses at an instant of time during data reading and an instant of time during data writing. A stable offset which prevents image tearing, can be calculated by using the data writing rate and the data reading rate. If a stable offset is not secured, in other words, if the distance between the address for current data writing and the address for current data reading is less than the stable offset, then the operation of writing image data is performed in the second memory 220 instead of the first memory 210.

The writing and reading operations of the first and second memories 210 and 220 may be controlled by a memory controller (not shown), such as a microprocessor.

Figure 3:
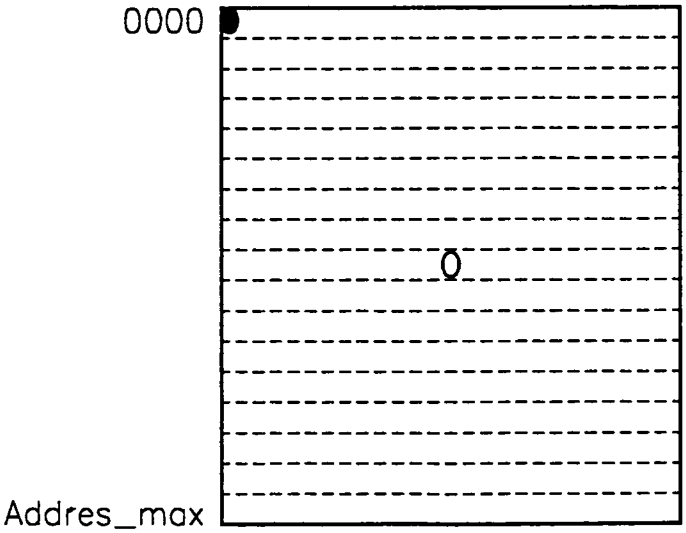
FIG. 3 shows a memory device for explaining the method for calculating a desired address offset.

FIG. 3 depicts a memory to explain a method for calculating an address offset. In FIG. 3, a black circle • represents an address (here 0000h) from which image data for reading is currently read out. An empty circle ○ represents a relative address in which image data for writing is currently written. The input rate (or writing rate) of image data into the memory is Mclock. The output rate (or reading rate) of image data from the memory is Dclock. When the reading and the writing operations are performed in a single memory, such as the first memory 210 in FIG. 2, in order to prevent image tearing, the distance between the address from which image data is currently being read out and the address in which image data is currently being written should be kept at least as far apart as the desired address offset. The desired address offset, calculated by using Dclock and Mclock, will be described below.

If Dclock is faster than Mclock, in other words, if the reading rate is faster than the writing rate, the distance between the address from which image data is being read out and the relative address in which image data is being written should be kept at least as far apart as the desired address offset, to achieve stable reading and writing in a single memory for preventing image tearing. The preferable address offset can be calculated by equation 1 below:

$$\text{Address\_offset}=\text{Address\_max}\times(D\text{clock}-M\text{clock})/D\text{clock} \quad (1)$$

where, Address_max is a maximum address of the memory, which is generally 3 times the resolution of the image to be displayed. For example, if the resolution is 1024×768, then Address_max becomes 1024×768×3.

If Mclock is faster than Dclock, in other words, if the writing rate is faster than the reading rate, the distance between the address from which image data is being read out and the address in which image data is being written should be kept at least as far apart as the desired address offset to achieve stable reading and writing in a single memory to prevent image tearing. The desired address offset can be calculated by equation 2 below:

$$\text{Address\_offset}=\text{Address\_max}\times(M\text{clock}-D\text{clock})/M\text{clock} \quad (2)$$

where, Address_max is a maximum address of the memory, which is generally 3 times the resolution of the image to be displayed, as described above.

Figure 4:
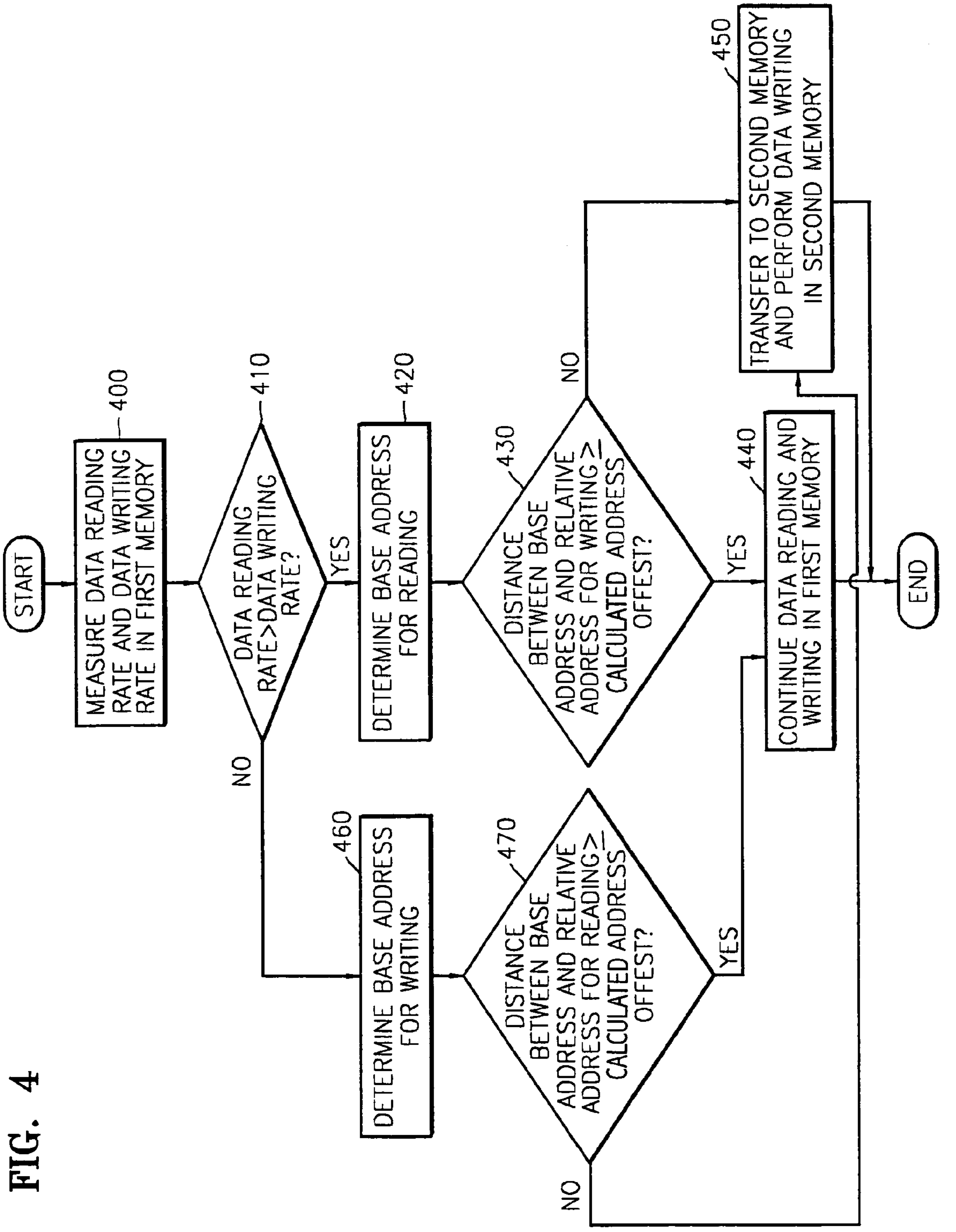
FIG. 4 is a flowchart illustrating a memory management method for preventing image tearing in a video reproducing system according to the present invention.

FIG. 4 is a flowchart illustrating a memory management method, according to an aspect of the present invention, used to prevent image tearing in a video reproducing system. Initially, the reading rate of image data (Dclock) and the writing rate of image data (Mclock) of a first memory (i.e., the first memory 210 in FIG. 2) are measured in operation 400. The reading rate (Dclock) and the writing rate (Mclock) are compared with each other in operation 410. If the reading rate (Dclock) is faster than the writing rate (Mclock), a base address for reading image data is determined in operation 420. The base address for reading may be the starting address of the memory. It is then determined if the relative address for writing is separated from the base address for reading by an amount equal to or greater than the desired address offset in operation 430. The desired address offset, Address_max may be calculated as in equation 1.

In operation 430, if the relative address for writing is separated from the base address for reading by an amount equal to or greater than the desired address offset, then reading and writing operations continue in the current memory frame as shown in operation 440 (here, the first memory 210) which has been used so far. In this case, the address from which image data is currently read out may not pass the address to which image data is currently being written in the current memory (the first memory 210) thereby preventing image tearing.

In operation 430, if the distance between the relative address for writing and the base address for reading is less than the desired address offset, Address_max in equation 1, in other words, if a distance between the current address for writing and the base (or current) address for reading is less than the desired address offset, then the writing operation should be performed in the second memory 220 instead of the first memory 210, as shown in operation 450.

If the writing rate is faster than the reading rate in operation 410, the base address for writing is determined in operation 460. The base address for writing is generally the starting address of the memory 210.

In operation 470, it is determined whether the relative address for reading from which image data is currently read out is separated from the base address for writing by an amount equal to or greater than the desired address offset, i.e., Address_offset in equation 2.

In operation 470, if the relative address for reading is separated from the base address for writing by an amount equal to or greater than the desired offset, then writing and reading operations continue in the current memory frame (the first memory 210) which has been used so far, as shown in operation 440. In this case, the address to which image data is currently written cannot pass the address in which image data is currently read out in the current memory frame (the first memory 210), thereby preventing image tearing.

In 470, if the distance between the relative address for reading and the base address for writing is less than the desired address offset, Address_offset in equation 2, in other words, if the distance between the relative address for reading and the base address for writing is less than the desired address offset, then the writing operation is performed in the other memory frame (i.e., the second memory 220) instead of the current memory frame (i.e., first memory 210), as shown in operation 450.

The present invention may be embodied as a computer code, which can be read by a computer, on a computer readable recording medium. The computer readable recording medium includes all manner and types of recording apparatuses on which computer readable data are stored.

The computer readable recording media includes at least storage media such as magnetic storage media (e.g., ROM's, floppy disks, hard disks, etc.), optically readable media (e.g., CD-ROMs, DVDs, etc.), and carrier waves (e.g., transmissions over the Internet). Also, the computer readable recording media can be distributed to computer systems connected through a network and can be stored and executed as a computer readable code in a distributed mode.

As described above, a memory management apparatus and method in a video reproducing system can prevent image tearing, a bothersome problem in this art, thereby helping to provide high quality video services. The apparatus and method can be applied to image processing systems including Liquid Crystal Displays, Plasma Display Panels, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A memory management apparatus in a video reproducing system, wherein input image data having a format is converted into a suitable format for a display, comprising:

a scaler to convert the format of the input image data;

a first memory having:

an address for writing, at which the format-converted image data is written at a data writing rate; and an address for reading, from which the format-converted image data is read at a data reading rate; and a second memory substituted for the first memory when a difference between the data reading rate and the data writing rate yields an unstable distance between the reading address and the writing address, the format-converted image data being written to the second memory when the second memory is substituted for the first memory so that the writing address does not overlap the reading address and the reading address does not overlap the writing address.

2. The apparatus of claim 1, further comprising a memory controller to control reading and writing operations of the first and second memories.

3. The apparatus of claim 1, further comprising a memory controller to control the substitution of the second memory for the first memory.

4. The apparatus of claim 3, wherein the memory controller is a microprocessor.

5. The apparatus of claim 3, wherein the memory controller calculates a desired address offset between the address for reading and the address for writing in the first memory, using the data reading rate, the data writing rate, and a resolution of the display.

6. The apparatus of claim 3, wherein the memory controller writes the format converted image data, output from the scaler, to the second memory instead of the first memory if a distance between a current address for reading and a current address for writing is within a desired address offset.

7. The apparatus of claim 6, wherein if the reading rate (Dclock) is faster than the writing rate (Mclock) in the first memory, the desired address offset, Address_offset, is calculated using the following:

$$\text{Address\_offset}=(\text{a maximum address of the first memory})\times(D\text{clock}-M\text{clock})/D\text{clock}.$$

8. The apparatus of claim 7, wherein the maximum address of the first memory is calculated by multiplying a resolution of the display by 3.

9. The apparatus of claim 6, wherein if the writing rate (Mclock) is faster than the reading rate (Dclock) in the first memory, the desired address offset, Address_offset, is calculated using the following:

$$\text{Address\_offset}=(\text{a maximum address of the first memory})\times(M\text{clock}-D\text{clock})/M\text{clock}.$$

10. The apparatus of claim 9, wherein the maximum address of the first memory is calculated by multiplying a resolution of the display by 3.

11. A memory management method to prevent image tearing in a video reproducing system comprising:

measuring a data writing rate (Mclock) and a data reading rate (Dclock) of a first memory;

determining an offset distance between a current address for writing and a current address for reading; and writing image data in a second memory instead of the first memory if the offset distance is within a predetermined address offset, wherein if the data writing rate (Mclock) is faster than the data reading rate (Dclock), the predetermined address offset, Address offset, is calculated using the following:

$$\text{Address\_offset}=(\text{a maximum address of the first memory})\times(M\text{clock}-D\text{clock})/M\text{clock}.$$

12. The method of claim 11, wherein the maximum address of the first memory is calculated by multiplying a resolution of a display on which image data are to be displayed by 3.

13. A memory management method to prevent image tearing in a video reproducing system comprising:

measuring a data writing rate (Mclock) and a data reading rate (Dclock) of a first memory;

determining an offset distance between a current address for writing and a current address for reading; and writing image data in a second memory instead of the first memory if the offset distance is within a predetermined address offset, wherein if the reading rate (Dclock) is faster than the writing rate (Mclock) in the first memory, the predetermined address offset, Address_offset, is calculated using the following:

$$\text{Address\_offset}=(\text{a maximum address of the first memory})\times(D\text{clock}-M\text{clock})/D\text{clock}.$$

14. The method of claim 13, wherein the maximum address of the first memory is calculated by multiplying a resolution of a display on which the image data are to be displayed by 3.

15. A memory management method for preventing image tearing in a video reproducing system comprising:

measuring a data writing rate (Mclock) and a data reading rate (Dclock) of a first memory;

comparing the data writing rate to the data reading rate;

calculating a desired address offset if the data reading rate is faster than the data writing rate;

determining a base address for data reading;

determining a relative address for data writing from the base address for data reading;

determining if a distance between the relative address for data writing and the base address for data reading is greater than or equal to the desired address offset;

if the distance is greater than or equal to the desired address offset, continuing the data writing and the data reading in the first memory; and if the distance is within the desired address offset, performing the data writing in a second memory instead of the first memory, wherein the desired address offset, Address offset, is calculated using the following:

$$\text{Address\_offset}=(\text{a maximum address of the first memory})\times(D\text{clock}-M\text{clock})/D\text{clock}.$$

16. The apparatus of claim 15, wherein the maximum address of the first memory is calculated by multiplying the resolution of a display on which image data are to be displayed by 3.

17. A memory management method to prevent image tearing in a video reproducing system comprising:

measuring a data writing rate (Mclock) and a data reading rate (Dclock) of a first memory;

comparing the data writing rate to the data reading rate;

calculating a desired address offset if the data writing rate is faster than the data reading rate;

determining a base address for data writing;

determining a relative address for data reading from the base address for data writing;

determining if a distance between the relative address for data reading and the base address for data writing is greater than or equal to the desired address offset;

if the distance is greater than or equal to the desired address offset, continuing the data writing and the data reading in the first memory; and if the distance is less than the desired address offset, performing the data writing in a second memory instead of the first memory, wherein the desired address offset, Address offset, is calculated using the following:

$$\text{Address\_offset}=(\text{a maximum address of the first memory})\times(M\text{clock}-D\text{clock})/M\text{clock}.$$

18. The method of claim 17, wherein the base address for data writing is a starting address of the first memory.

19. The method of claim 17, wherein the maximum address of the first memory is calculated by multiplying the resolution of a display on which image data are to be displayed by 3.

20. A computer readable medium on which a program for implementing a method for managing memory to prevent image tearing in a video reproducing system, wherein the method comprises:

measuring a data writing rate (Mclock) and a data reading rate (Dclock) of a first memory;

comparing the data writing rate to the data reading rate;

calculating a desired address offset if the data reading rate is faster than the data writing rate;

determining a base address for data reading;

determining a relative address for data writing from the base address for data reading;

determining if a distance between the relative address for data writing and the base address for data reading is greater than or equal to the desired address offset;

if the distance is greater than or equal to the desired address offset, continuing the data writing and the data reading in the first memory; and if the distance is within the desired address offset, performing the data writing in a second memory instead of the first memory, wherein the desired address offset, Address offset, is calculated using the following:

$$\text{Address\_offset}=(\text{a maximum address of the first memory})\times(M\text{clock}-D\text{clock})/M\text{clock}.$$

21. The computer readable medium on which a program for implementing a method for managing memory to prevent image tearing in a video reproducing system of claim 20, wherein the computer readable media is distributed to a computer system connected through a network and is stored and executed as a computer readable code in a distributed mode.

22. A computer readable medium on which a program for implementing a method for managing memory to prevent image tearing in a video reproducing system, wherein the method comprises:

measuring a data writing rate (Mclock) and a data reading rate (Dclock) of a first memory;

comparing the data writing rate to the data reading rate;

calculating a desired address offset if the data writing rate is faster than the data reading rate;

determining a base address for data writing;

determining a relative address for data reading from the base address for data writing;

determining if a distance between the relative address for data reading and the base address for data writing is greater than or equal to the desired address offset;

if the distance is greater than or equal to the desired address offset, continuing the data writing and the data reading in the first memory; and if the distance is less than the desired address offset, performing the data writing in a second memory instead of the first memory, wherein the desired address offset, Address offset, is calculated using the following:

$$\text{Address\_offset}=(\text{a maximum address of the first memory})\times(D\text{clock}-M\text{clock})/D\text{clock}.$$

23. The computer readable medium on which a program for implementing a method for managing memory to prevent image tearing in a video reproducing system of claim 22, wherein the computer readable medium is distributed to a computer system connected through a network and is stored and executed as a computer readable code in a distributed mode.

* * * * *

UNITED STATES PATENT AND TRADEMARK OFFICE

CERTIFICATE OF CORRECTION

PATENT NO. : 7,023,443 B2
APPLICATION NO. : 10/750841
DATED : April 4, 2006
INVENTOR(S) : Gyeong-ho Yu It is certified that error appears in the above-identified patent and that said Letters Patent is hereby corrected as shown below:

Column 7, line 7, change "format converted" to --format–converted--

Column 7, line 40, change "Address offset" to --Address_offset--

Column 8, line 24, change "Address offset" to --Address_offset--

Column 8, line 53, change "Address offset" to --Address_offset--

Column 9, line 18, change "Address offset" to --Address_offset--

Column 10, line 19, change "Address offset" to --Address_offset--

Signed and Sealed this

Nineteenth Day of September, 2006

JON W. DUDAS
*Director of the United States Patent and Trademark Office*